US012661738B2

(12) United States Patent
Sicre

(10) Patent No.: US 12,661,738 B2
(45) Date of Patent: Jun. 23, 2026

(54) DEPOSITION HEAD OF A THREE-DIMENSIONAL PRINTER, SAID DEPOSITION HEAD BEING CONFIGURED TO DEPOSIT SEVERAL WIRES SIMULTANEOUSLY, AND THREE-DIMENSIONAL PRINTER COMPRISING SAID DEPOSITION HEAD

(71) Applicant: Airbus Operations SAS, Toulouse (FR)

(72) Inventor: Matthieu Sicre, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 952 days.

(21) Appl. No.: 17/945,512

(22) Filed: Sep. 15, 2022

(65) Prior Publication Data
US 2023/0081526 A1 Mar. 16, 2023

(30) Foreign Application Priority Data

Sep. 16, 2021 (FR) ...................................... 2109706

(51) Int. Cl.
*B23K 26/00* (2014.01)
(52) U.S. Cl.
CPC ................................ *B23K 26/0006* (2013.01)
(58) Field of Classification Search
CPC ................................................. B23K 26/0006
USPC ....................................................... 219/76.1
See application file for complete search history.

(56) References Cited

U.S. PATENT DOCUMENTS

| | | | | | |
|---|---|---|---|---|---|
| 2,432,428 | A | * | 12/1947 | Lang .................... | B23K 3/0615 228/52 |
| 2,790,925 | A | * | 4/1957 | Landis ................. | B23K 9/1336 138/131 |
| 2,880,305 | A | * | 3/1959 | Baird ................... | B23K 9/1336 219/137.9 |
| 2,900,488 | A | * | 8/1959 | Bassot ................. | B23K 9/1336 219/137.44 |
| 3,007,033 | A | * | 10/1961 | Newman .............. | B23K 9/1735 219/137 R |

(Continued)

FOREIGN PATENT DOCUMENTS

| | | |
|---|---|---|
| CN | 2683302 Y | 3/2005 |
| CN | 110125518 A | 8/2019 |
| WO | 2019246308 A1 | 12/2019 |

OTHER PUBLICATIONS

French Search Report; priority document, Jun. 30, 2022.

*Primary Examiner* — Jimmy Chou
(74) *Attorney, Agent, or Firm* — Greer, Burns & Crain, Ltd.

(57) ABSTRACT
A deposition head for a three-dimensional printer with at least one pay-out device which comprises several wire spools, each spool having a wire to be deposited simultaneously with the other wires, a drive system having a drive roller with several grooves, one for each wire to be deposited simultaneously, a wire guide which has a first end, a second end close to a deposition zone during operation, and also a passage hole opening out at each of the first and second ends, the passage hole having several passage sections at the second end, one for each wire to be deposited simultaneously, and each passage section having a section substantially identical to the section of the wire to be guided.

10 Claims, 3 Drawing Sheets

(56) References Cited

U.S. PATENT DOCUMENTS

| | | | | |
|---|---|---|---|---|
| 3,167,636 A * | 1/1965 | Bosteels | | B23K 9/025 |
| | | | | 219/124.22 |
| 3,396,891 A * | 8/1968 | De Jong | | B23K 9/133 |
| | | | | 226/193 |
| 3,430,832 A * | 3/1969 | Meyer | | B23K 9/1336 |
| | | | | 242/157 R |
| 3,694,620 A | 9/1972 | Gleason | | |
| 4,837,420 A * | 6/1989 | Niinivaara | | B23K 9/1336 |
| | | | | 219/136 |
| 4,898,317 A * | 2/1990 | Ito | | B23K 9/1336 |
| | | | | 228/52 |
| 5,782,987 A * | 7/1998 | Furman | | B23K 9/1336 |
| | | | | 219/136 |
| 5,816,466 A * | 10/1998 | Seufer | | B23K 9/1333 |
| | | | | 242/615.3 |
| 5,836,539 A * | 11/1998 | Grimm | | B23K 9/1336 |
| | | | | 242/615.3 |
| 6,064,036 A * | 5/2000 | Kensrue | | B23K 9/1333 |
| | | | | 219/137.2 |
| 6,066,833 A * | 5/2000 | Rigdon | | B23K 9/1333 |
| | | | | 219/137.2 |
| 6,388,234 B1 * | 5/2002 | Collins | | B23K 9/1336 |
| | | | | 228/244 |
| 7,301,124 B2 * | 11/2007 | Kaufman | | B23K 9/1336 |
| | | | | 219/137.71 |
| 7,615,723 B2 * | 11/2009 | Matiash | | B23K 9/124 |
| | | | | 242/615.3 |
| 8,302,837 B1 * | 11/2012 | De Berardinis | | B23K 9/1336 |
| | | | | 228/52 |
| 8,569,653 B2 * | 10/2013 | Enyedy | | B23K 9/1336 |
| | | | | 219/136 |
| 9,566,658 B1 * | 2/2017 | Herrold | | B23K 9/10 |
| 11,894,642 B2 * | 2/2024 | Altekruse | | H01R 27/00 |
| 12,378,093 B2 * | 8/2025 | Christopher | | B65H 49/26 |
| 2003/0057187 A1 * | 3/2003 | Baiardi | | B23H 7/108 |
| | | | | 219/69.12 |
| 2004/0011776 A1 * | 1/2004 | Mukai | | B23K 9/1336 |
| | | | | 219/137.71 |
| 2004/0026393 A1 * | 2/2004 | Matiash | | B23K 9/32 |
| | | | | 219/137.9 |
| 2005/0006425 A1 * | 1/2005 | Enyedy | | B65H 51/10 |
| | | | | 226/190 |
| 2005/0040202 A1 * | 2/2005 | Kerekes | | B23K 9/133 |
| | | | | 226/186 |
| 2005/0127233 A1 * | 6/2005 | Hsu | | B23K 9/1333 |
| | | | | 242/593 |
| 2005/0199606 A1 * | 9/2005 | Enyedy | | B23K 9/1336 |
| | | | | 219/137.7 |
| 2005/0199673 A1 * | 9/2005 | Enyedy | | B23K 9/173 |
| | | | | 226/190 |
| 2006/0081675 A1 * | 4/2006 | Enyedy | | B23K 9/125 |
| | | | | 226/190 |
| 2006/0124622 A1 * | 6/2006 | Hubinger | | B23K 9/28 |
| | | | | 219/137.31 |
| 2006/0157461 A1 * | 7/2006 | Diekmann | | B23K 9/1336 |
| | | | | 219/137.2 |
| 2007/0039935 A1 * | 2/2007 | Justice | | B23K 9/10 |
| | | | | 219/137.71 |
| 2007/0164074 A1 * | 7/2007 | Schorghuber | | B23K 9/133 |
| | | | | 226/108 |
| 2008/0073331 A1 * | 3/2008 | Schafer | | B23K 9/1336 |
| | | | | 242/422.5 |
| 2011/0042355 A1 * | 2/2011 | Gelmetti | | B23K 9/182 |
| | | | | 219/73 |
| 2011/0100969 A1 * | 5/2011 | Enyedy | | B23K 9/1336 |
| | | | | 219/136 |
| 2011/0155739 A1 * | 6/2011 | Arita | | B65H 57/18 |
| | | | | 220/694 |
| 2011/0174792 A1 * | 7/2011 | Gelmetti | | B23K 9/133 |
| | | | | 219/136 |
| 2011/0198331 A1 * | 8/2011 | Shigeyoshi | | B23K 9/126 |
| | | | | 219/130.32 |
| 2011/0290771 A1 * | 12/2011 | Fukunaga | | B23K 9/126 |
| | | | | 219/130.1 |
| 2012/0152921 A1 * | 6/2012 | Peters | | B23K 9/123 |
| | | | | 219/137 R |
| 2012/0285938 A1 * | 11/2012 | McFadden | | B23K 9/1336 |
| | | | | 219/130.1 |
| 2012/0298639 A1 * | 11/2012 | Wang | | B23K 26/20 |
| | | | | 219/121.64 |
| 2012/0305532 A1 * | 12/2012 | Harris | | B23K 9/095 |
| | | | | 219/76.14 |
| 2014/0048525 A1 * | 2/2014 | Enyedy | | B23K 9/1336 |
| | | | | 219/137.44 |
| 2014/0069907 A1 * | 3/2014 | Ma | | B23K 9/1336 |
| | | | | 219/137.44 |
| 2016/0288237 A1 * | 10/2016 | Gelmetti | | B23K 9/125 |
| 2018/0099834 A1 * | 4/2018 | Madrid | | B65H 75/02 |
| 2018/0178309 A1 * | 6/2018 | Inoue | | B23K 9/133 |
| 2019/0015922 A1 * | 1/2019 | Inoue | | B23K 9/092 |
| 2019/0168334 A1 * | 6/2019 | Kooken | | B33Y 10/00 |
| 2019/0201997 A1 * | 7/2019 | Stergios | | B23K 9/04 |
| 2019/0224772 A1 * | 7/2019 | Kawai | | B23K 9/133 |
| 2019/0314921 A1 * | 10/2019 | Sakaguchi | | B23K 9/173 |
| 2020/0114448 A1 * | 4/2020 | Petot | | B23K 9/325 |
| 2020/0114452 A1 * | 4/2020 | Peters | | B23K 9/1333 |
| 2020/0156171 A1 * | 5/2020 | Albright | | B33Y 30/00 |
| 2020/0189019 A1 * | 6/2020 | Bombardier | | B23K 35/0266 |
| 2020/0238418 A1 * | 7/2020 | Hutchison | | B23K 9/0956 |
| 2020/0246891 A1 * | 8/2020 | Mehlman | | B23K 9/1336 |
| 2021/0053138 A1 * | 2/2021 | Hoeger | | B23K 9/173 |
| 2021/0078109 A1 * | 3/2021 | Petot | | B23K 26/0622 |
| 2021/0094112 A1 * | 4/2021 | Henry | | B29C 64/295 |
| 2021/0138538 A1 * | 5/2021 | Kilcoyne | | B33Y 30/00 |
| 2021/0229205 A1 * | 7/2021 | Hassan | | B23K 9/173 |
| 2021/0370431 A1 * | 12/2021 | Brown | | B65H 51/10 |
| 2023/0081526 A1 * | 3/2023 | Sicre | | B23K 26/702 |
| | | | | 425/130 |

* cited by examiner

Fig. 7
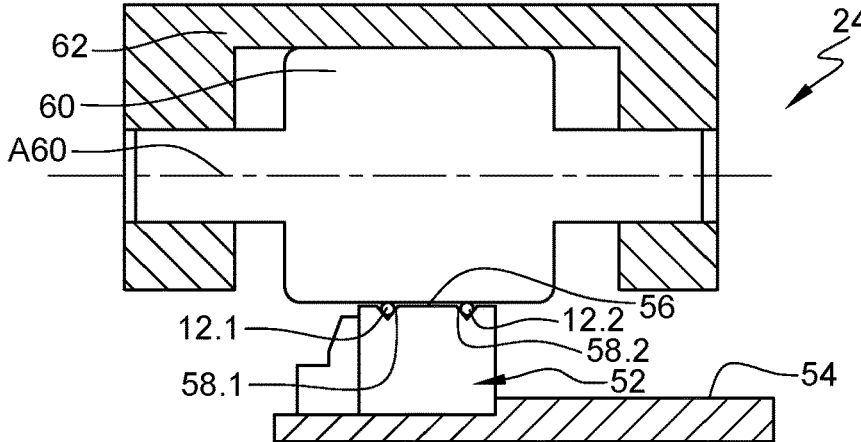
Fig. 8
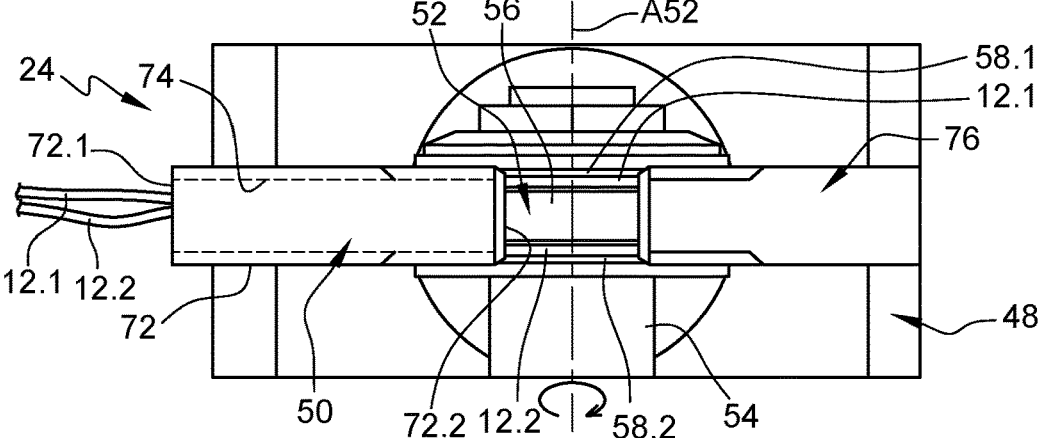
Fig. 9
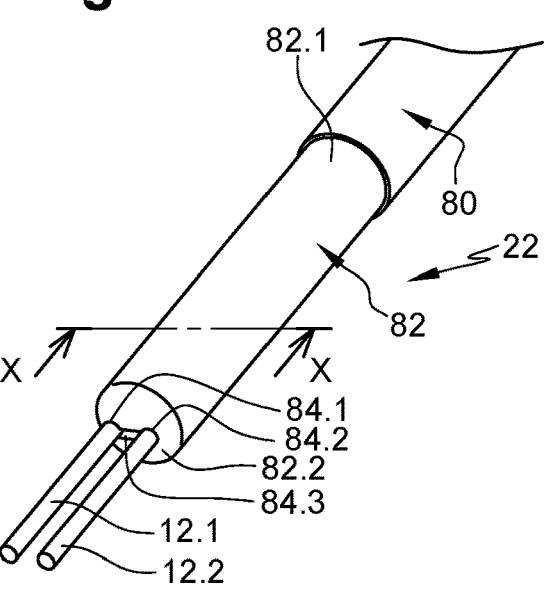
Fig. 10
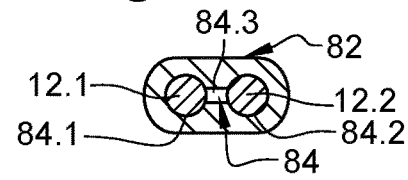
Fig. 11A
Fig. 11B
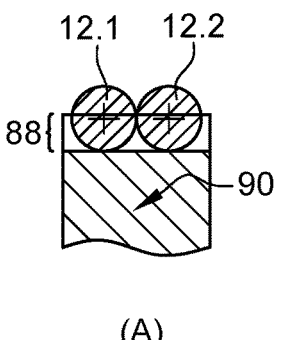
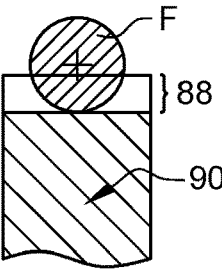
(A)            (B)

1

DEPOSITION HEAD OF A THREE-DIMENSIONAL PRINTER, SAID DEPOSITION HEAD BEING CONFIGURED TO DEPOSIT SEVERAL WIRES SIMULTANEOUSLY, AND THREE-DIMENSIONAL PRINTER COMPRISING SAID DEPOSITION HEAD

CROSS-REFERENCES TO RELATED APPLICATIONS

This application claims the benefit of the French patent application No. 2 109 706 filed on Sep. 16, 2021, the entire disclosures of which are incorporated herein by way of reference.

FIELD OF THE INVENTION

The present application relates to a deposition head of a three-dimensional printer, said deposition head being configured to deposit several wires simultaneously, and to a three-dimensional printer comprising said deposition head.

BACKGROUND OF THE INVENTION

In the field of aeronautics, certain titanium components, such as a primary structure of a pylon of a jet engine, are produced by assembling a plurality of complex parts machined from blocks of material. This manufacturing technique is relatively lengthy and generates a great deal of material loss in the form of titanium chips that cannot be reused.

In order to reduce the amount of waste, additive manufacturing methods make it possible to produce components by stacking layers of material on top of one another.

According to an additive manufacturing method involving directed energy deposition (DED), the material in the form of a wire is deposited, by virtue of a deposition head, at the same time as the provision of energy in the form of a laser beam or an electron beam, for example.

According to one embodiment, the deposition head comprises a pay-out device supporting a wire spool, a drive system for driving the wire which is configured to pull the wire off from the spool and to push it in the direction of a guide system traversed by the wire and positioned as close as possible to the deposition zone. This deposition head is configured to deposit a single wire.

Since the rate of material deposited depends on the diameter of the wire deposited and on the feed speed thereof, it is necessary to use a wire with a large section in order to obtain a high rate of material deposited and a high production rate. However, the greater the section of the wire, the less satisfactory is the surface condition of the component obtained.

The present invention seeks to remedy all or some of the drawbacks of the prior art.

SUMMARY OF THE INVENTION

To that end, a subject of the invention is a deposition head for a three-dimensional printer, comprising at least one pay-out device, a drive system for driving at least one wire, and a guide system for guiding the wire, said guide system being positioned in the vicinity of a deposition zone during operation, the drive system comprising a drive roller configured to pivot about a pivot axis at a rotational speed determined as a function of a desired speed of travel of the wire, the drive roller having a cylindrical lateral surface coaxial with the pivot axis, and also a groove positioned on the lateral surface in a plane substantially perpendicular to the pivot axis, the guide system comprising a wire guide which has a first end, a second end close to the deposition zone during operation, and also a passage hole opening out at each of the first and second ends, the passage hole having a passage section at the second end having a section substantially identical to the section of the wire to be guided.

According to the invention, the pay-out device comprises several wire spools, one for each wire to be deposited simultaneously, and, for at least one wire spool, a friction braking system for limiting the rotation of the wire spool. At the same time, the drive roller has several grooves, one for each wire to be deposited simultaneously, the passage hole of the wire guide comprising several passage sections, one for each wire to be deposited simultaneously.

According to a first advantage, this deposition head makes it possible to improve the surface condition of the component obtained insofar as the sections of several wires deposited simultaneously come closer to an ideal rectangular section of a material layer than a single wire. According to another advantage, the fact that several wires are deposited simultaneously makes it possible, with a constant wire section, to increase the rate of material deposited.

According to another feature, the pay-out device comprises at least one cylindrical support on which at least one wire spool is threaded. In addition, the braking system comprises a body mounted on the support, a coupling connecting the body and the wire spool, and a friction mechanism limiting, by friction, a pivoting movement of the body with respect to the support.

According to another feature, the body comprises first and second tubular parts which are separated by a transverse slot which extends over part of the cross section of the body, the first tubular part being mounted on the support with a sliding fit, the second tubular part comprising a longitudinal slot which extends as far as the transverse slot in such a way that the second tubular part has a C-shaped cross section with two ends.

According to another feature, the friction mechanism comprises a toggle latch connecting the ends of the C-shaped cross section of the second tubular part.

According to another feature, the coupling comprises at least one radial branch which has a first end connected to the body and a second end connected to the wire spool by a removable connecting element.

According to another feature, the pay-out device comprises a bearing face, the support comprising a first end connected to said bearing face, a free end and an axle substantially perpendicular to the bearing face, the support being dimensioned to support at least two wire spools such that a first wire spool is close to the free end of the support and a second wire spool is pressed against the bearing face. In addition, the braking mechanism is mounted on the support in such a way that the second wire spool is kept pressed against the bearing face by the first wire spool, which is itself kept pressed against the second wire spool by the friction mechanism.

According to another feature, the drive system comprises an upstream or downstream wire guide, positioned upstream or downstream of the drive roller in the direction of travel of the wires, comprising a body which extends between first and second ends and has a passage hole opening out at each of the first and second ends, the second end being positioned as close as possible to the drive roller so that the wires remain rectilinear between the upstream or downstream wire guide and the drive roller, the passage hole of the upstream or downstream wire guide comprising a passage section for each wire to be deposited simultaneously, each passage section having a section substantially identical to the section of the wire to be guided.

According to another feature, the passage sections are separated from one another by a distance substantially equal to that which separates the grooves of the drive roller.

According to another feature, each passage section has a rectilinear segment which extends from the second end by a few millimeters, the segments of the different passage sections being parallel to one another and being oriented in a direction tangential to the drive roller.

Another subject of the invention is a three-dimensional printer comprising a deposition head according to one of the preceding features.

BRIEF DESCRIPTION OF THE DRAWINGS

Other features and advantages will become apparent from the following description of the invention, which description is given solely by way of example, with reference to the appended drawings in which:

FIG. 7 is a section of the wire drive system along line VII-VII in FIG. 5, FIG. 8 is a top view of the drive system visible in FIG. 5, FIG. 9 is a perspective view of a guide system for guiding several wires illustrating one embodiment of the invention, FIG. 10 is a section of the guide system along line X-X in FIG. 9, FIG. 11A is section of a component obtained from the fusion of two wires, and.

FIG. 11B is section of a component obtained from the fusion of a single wire.

DETAILED DESCRIPTION OF THE PREFERRED EMBODIMENTS

Figure 1:
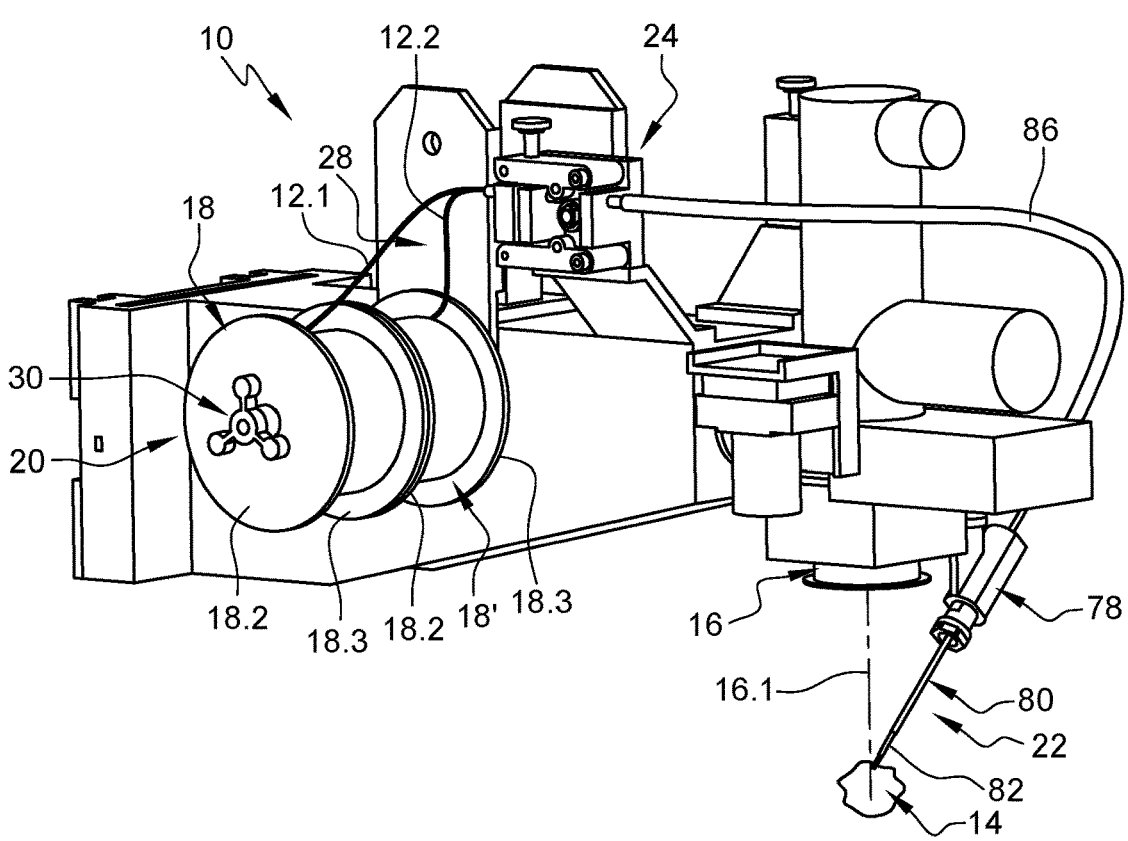
FIG. 1 is a perspective view of a deposition head illustrating one embodiment of the invention.

According to one embodiment visible in FIG. 1, a deposition head 10 of a three-dimensional printer is configured to simultaneously deposit at least two wires 12.1, 12.2 at a deposition zone 14.

According to one configuration, the deposition head 10 comprises a focused energy source 16 configured to generate an energy beam 16.1 oriented in the direction of the deposition zone 14.

According to one configuration, the focused energy source may be supported by another part of the three-dimensional printer.

According to one application, the wires 12.1, 12.2 are made of titanium and each have a diameter of the order of 1.6 mm. Of course, the invention is not limited to this material or to this diameter for the wires 12.1, 12.2, the latter being able to be made of the same material or of different materials.

Figure 2:
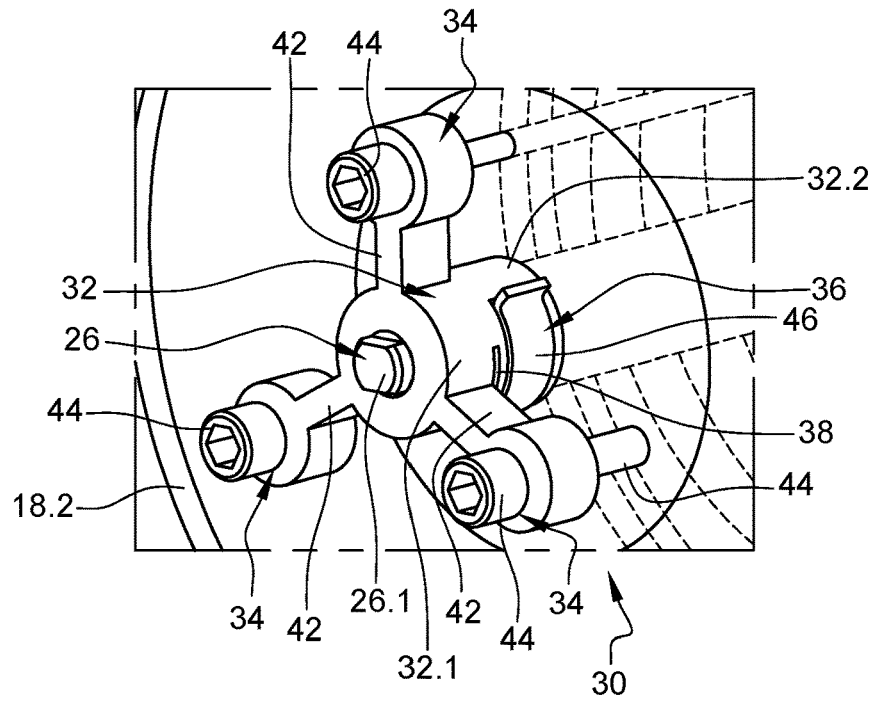
FIG. 2 is a perspective view of a braking system of a pay-out device illustrating one embodiment of the invention.
Figure 3:
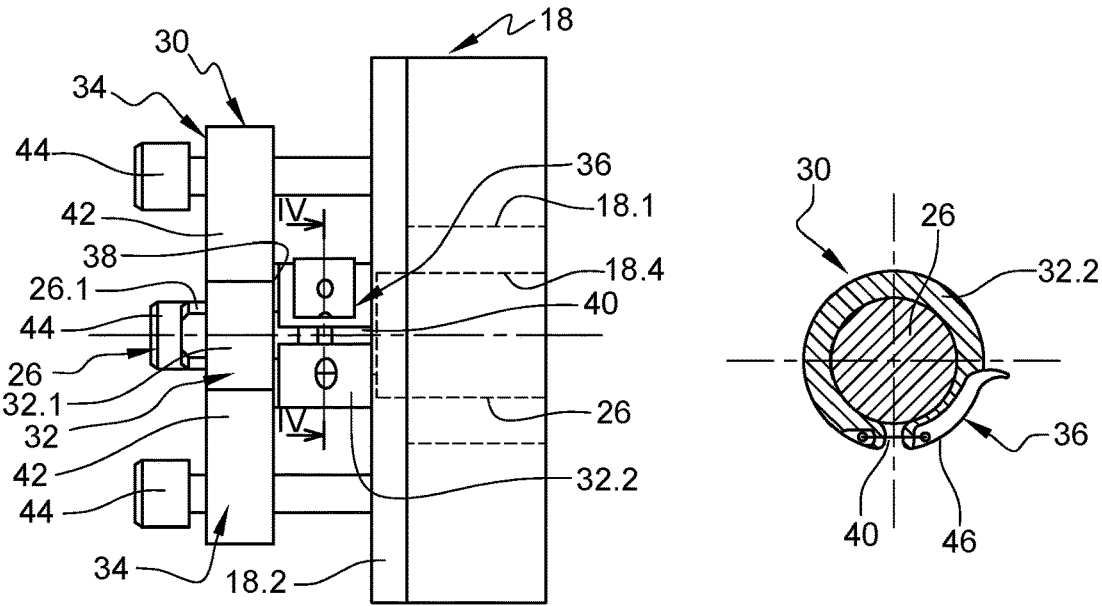
FIG. 3 is a lateral view of the braking system visible in FIG. 2.

According to one embodiment visible in FIGS. 1 to 3, each wire 12.1, 12.2 is packaged on a wire spool 18 which has a hub 18.1 (visible in FIG. 3) and two flanges 18.2, 18.3 at each end of the hub 18.1, the wire being wound on the hub 18.1 between the two flanges 18.2, 18.3. The hub 18.1 has a through-hole 18.4 which opens out at each end of the hub 18.1. This through-hole 18.4 is substantially coaxial with this hub 18.1 and perpendicular to the flanges 18.2, 18.3.

The deposition head 10 comprises at least one pay-out device 20 comprising several wire spools 18, one for each wire to be deposited simultaneously, a guide system 22 for guiding the wires 12.1, 12.2, said guide system being positioned in the vicinity of the deposition zone 14, and a drive system 24 configured to pull the wires 12.1, 12.2, to bring them out of the pay-out device 20 and to push them in the direction of the guide system 22.

According to one embodiment, the pay-out device 20 comprises at least one cylindrical support 26 on which at least one wire spool 18 is threaded. The diameters of the support 26 and of the through-hole 18.4 of the wire spool 18 are adjusted in such a way that the wire spool 18 can pivot freely on the support 26.

According to one configuration, the pay-out device 20 comprises a bearing face 28 to which the support 26 is attached, the axle of the support 26 being substantially perpendicular to the plane of the bearing face 28. According to this configuration, the support 26 has a first end 26.1, referred to as free end, remote from the bearing face 28 and a second end connected to the bearing face 28.

The pay-out device 20 may comprise several supports 26, for example one for each wire spool 18. According to one configuration, at least one support 26 is configured to support several wire spools 18, 18', as illustrated in FIG. 1. In this case, the support 26 has a length (dimension measured between the bearing face 28 and its free end 26.1) greater than the sum of the widths (dimensions measured along the axle of the hub 18.1) of the wire spools 18, 18' which are supported by the support 26 such that its free end 26.1 protrudes with respect to the wire spools. According to one arrangement visible in FIG. 1, the support 26 supports two wire spools 18, 18', the first wire spool 18 having a flange 18.2 positioned in the vicinity of the free end 26.1 of the support 26, the second wire spool 18' having a flange 18.3 pressed against the bearing face 28.

According to one embodiment, the pay-out device 20 comprises, for at least one wire spool 18, a friction braking system 30 for limiting the rotation of the wire spool 18 when the drive system 24 stops pulling the wires 12.1, 12.2. According to one configuration which is not shown, the pay-out device 20 comprises a braking system 30 for each wire spool 18.

According to one configuration visible in FIGS. 1 to 4, each support 26 comprises a braking system 30.

The braking system 30 comprises a body 32 mounted on the free end 26.1 of the support 26, a coupling 34 connecting the body 32 and the first wire spool 18 (closest to the end 26.1), and a friction mechanism 36 limiting, by friction, the pivoting movement of the body 32 with respect to the support 26.

According to one configuration, the body 32 is a tube which is threaded on the support 26 and which has first and second tubular parts 32.1, 32.2 which are separated by a transverse slot 38 which extends over part (approximately half) of the cross section of the body 32. The first tubular part 32.1 is mounted on the support 26 with a sliding fit. The second tubular part 32.2 has a longitudinal slot 40 which extends as far as the transverse slot 38 in such a way that the second tubular part 32.2 has a C-shaped cross section.

The coupling 34 comprises at least one radial branch 42 which has a first end connected to the body 32, more particularly to the first tubular part 32.1, and a second end connected to the first wire spool 18 by a removable connecting element, such as a screw 44. According to one arrangement, the coupling 34 comprises three radial branches 42 forming between them an angle of 120°. Of course, the invention is not limited to this solution for coupling the body 32 and the first wire spool 18 in a removable manner.

Figure 4:
FIG. 4 is a section of the braking system along line IV-IV in FIG. 3.
Figure 5:
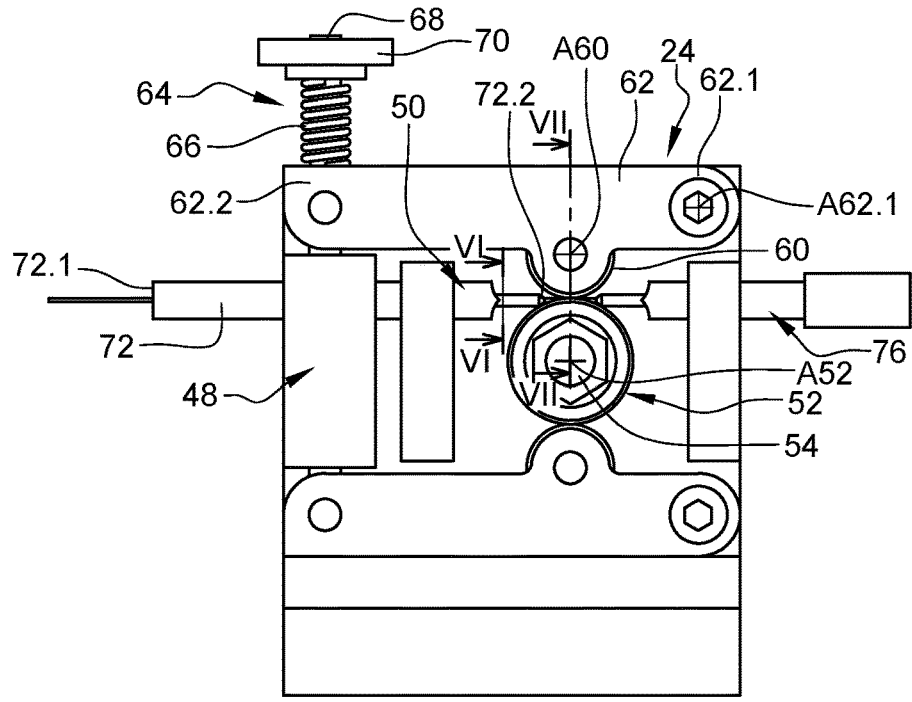
FIG. 5 is a front view of a drive system for driving several wires illustrating one embodiment of the invention.
Figure 6:
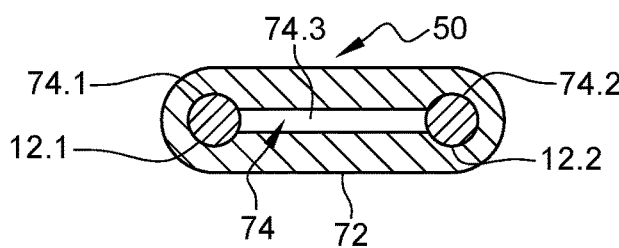
FIG. 6 is a section of the wire drive system along line VI-VI in FIG. 5.

According to one embodiment visible in FIG. 4, the friction mechanism 36 comprises a toggle latch 46 connecting the ends of the C-shaped cross section of the second tubular part 32.2, said toggle latch 46 being configured to deform this second tubular part 32.2 and to bring about clamping of the support 26.

Of course, the invention is not limited to this solution for obtaining a friction mechanism.

In order to achieve the braking of the second wire spool 18', the braking mechanism 30 is mounted on the support 26 in such a way that the second wire spool 18' is kept pressed against the bearing face 28 by the first wire spool 18, which is itself kept pressed against the second wire spool 18' by the friction mechanism 36. Thus, the braking of the second wire spool 18' is achieved due to the friction between the first and second wire spools 18, 18' and between the second wire spool 18' and the bearing face 28.

Irrespective of the embodiment, the system (or systems) allows (allow) the wire spools 18, 18' to pivot independently of one another. Thus, even if the spools do not have the same amount of wire, the different wires fed are pulled at the same speed by the drive system 24.

According to one embodiment visible in FIGS. 5 to 8, the drive system 24 comprises a frame 48 supporting an upstream wire guide 50 and a drive roller 52.

This drive roller 52 is mounted on a shaft 54 driven in rotation by a motorization system (not shown). The drive roller 52 is coupled to the shaft 54 in such a way that it is fixed in terms of rotation with respect to the shaft 54. Irrespective of the mounting, the drive roller 52 pivots about a pivot axis A52 at a rotational speed determined as a function of the desired speed of travel of the wires.

This drive roller 52 has a cylindrical lateral surface 56 coaxial with the pivot axis A52, and also a groove 58.1, 58.2 for each wire 12.1, 12.2 to be driven, said groove being positioned on the circumference of the lateral surface 56, in a plane substantially perpendicular to the pivot axis A52. According to the example illustrated in FIG. 7, the drive roller 52 comprises two grooves 58.1, 58.2. Of course, the invention is not limited to this number of grooves.

Each groove 58.1, 58.2 has such a section that the wire 12.1, 12.2 protrudes with respect to the lateral surface 56 when said wire is positioned in the groove 58.1, 58.2. By way of example, each groove 58.1, 58.2 has a V-shaped section.

According to the invention, all of the wires deposited simultaneously are driven by the same drive roller 52 so as to guarantee the same speed of travel and deposition.

The surface of the grooves 58.1, 58.2 and/or the material pair drive roller/wires are/is configured so as to reinforce the adhesion of the wires 12.1, 12.2 to the drive roller 52.

According to one configuration, the drive system 24 comprises a pressing roller 60 for pressing the wires 12.1, 12.2 against the drive roller 52 and thus reinforcing the adhesion of the wires 12.1, 12.2 to the drive roller 52.

This pressing roller 60 is mounted so as to pivot with respect to an arm 62 in such a way as to be able to pivot freely about a pivot axis A60 parallel to the pivot axis A52 of the drive roller 52. This arm 62 is connected to the frame 48 so as to occupy a first position, visible in FIG. 7, in which the pressing roller 60 exerts a pressure on the wires 12.1, 12.2 in the direction of the drive roller 52, and a second position in which the pressing roller 60 is moved away from the drive roller 52 so as to allow the wires 12.1, 12.2 to be installed.

According to one arrangement, the arm 62 has a first end 62.1 connected to the frame 48 by an axis of rotation A62.1 substantially parallel to the pivot axes A52, A60 of the drive roller 52 and of the pressing roller 60. Thus, the arm 62 can pivot about the axis of rotation A62.1 in a first direction, which tends to move it closer to the drive roller 52, or in a second direction, which tends to move it away from said drive roller.

According to one configuration, the drive system 24 comprises a control mechanism 64 for adjusting the pressure exerted by the pressing roller 60 on the wires 12.1, 12.2. This control mechanism 64 comprises a spring 66 bearing against the second end 62.2 of the arm, said spring being configured to exert a force on the arm 62 that tends to cause said arm to pivot in the first direction. In addition, the control mechanism 64 comprises a threaded rod 68 which is connected to the frame 48, which passes through the second end 62.2 of the arm 62 and on which the spring 66 is threaded, and also a nut 70 configured to be screwed on the threaded rod 68 and to compress the spring 66 against the arm 62 to a greater or lesser extent.

According to one embodiment, the upstream wire guide 50 is positioned upstream of the drive roller 52 and comprises a body 72, fixed to the frame 48, which extends between first and second ends 72.1, 72.2 and which has a passage hole 74 opening out at each of the ends 72.1, 72.2. According to one configuration, the first end 72.1 is spaced apart from the drive roller 52, the second end 72.2 being positioned as close as possible to the drive roller 52 so that the wires 12.1, 12.2 remain rectilinear between the upstream wire guide 50 and the drive roller 52. As close as possible is understood to mean that the second end 72.2 is separated from the points of contact between the wires 12.1, 12.2 and the drive roller 52 by a distance less than or equal to 0.5 mm.

At the first end 72.1, the passage hole 74 has a circular section considerably greater than the section of the wires 12.1, 12.2. At the second end 72.2, the passage hole 74 comprises, for each wire 12.1, 12.2, a passage section 74.1, 74.2 having a section substantially identical to the section of the guided wire 12.1, 12.2. According to one configuration, the passage sections 74.1, 74.2 are separate and separated by material. According to another configuration visible in FIG. 6, the passage sections 74.1, 74.2 are connected by a slot 74.3 which has a thickness smaller than the diameter of the wires 12.1, 12.2.

The upstream wire guide 50 comprises a passage section 74.1, 74.2 for each of the wires 12.1, 12.2 deposited simultaneously.

Each passage section 74.1, 74.2 has a rectilinear segment which extends from the second end by a few millimeters. The segments of the different passage sections are parallel to one another and oriented in a direction tangential to the drive roller 52.

The passage sections 74.1, 74.2 are separated from one another by a distance substantially equal to the distance separating the grooves 58.1, 58.2 of the drive roller 52. Thus, the passage sections make it possible to pre-position each of the wires 12.1, 12.2 in line with a groove 58.1, 58.2.

The section of the passage hole 74 may change gradually between the first and second ends 72.1, 72.2.

According to one embodiment, the drive system 24 comprises a downstream wire guide 76 positioned after the drive roller 52 in the direction of travel of the wires 12.1, 12.2. According to one configuration, the downstream wire guide 76 is identical to the upstream wire guide 50, the upstream and downstream wire guides 50, 76 being positioned symmetrically with respect to a plane perpendicular to the wires 12.1, 12.2, passing through the pivot axis A52 of the drive roller 52.

According to one embodiment, the guide system 22 comprises a body 78, a rectilinear, rigid guide tube 80 which is supported by the body 78 and through which the wires 12.1, 12.2 to be deposited simultaneously move, and a wire guide 82 positioned at an end of the guide tube 80 that is oriented toward the deposition zone 14. According to one configuration, the wire guide 82 of the guide system 22 extends between first and second ends 82.1, 82.2 and has a passage hole 84 opening out at each of the ends 82.1, 82.2. According to one configuration, the first end 82.1 is connected to the guide tube 80 and the second end 82.2 is positioned as close as possible to the deposition zone 14 during operation. As close as possible is understood to mean that the second end 82.2 is separated from the deposition zone 14 by a distance less than or equal to 5 cm, preferably less than or equal to 3 cm.

At the first end 82.1, the passage hole 84 has a circular section considerably greater than the section of the wires 12.1, 12.2. At the second end 82.2, the passage hole 84 comprises, for each wire 12.1, 12.2, a passage section 84.1, 84.2 having a section substantially identical to the section of the guided wire 12.1, 12.2. According to one configuration visible in FIG. 10, the passage sections 84.1, 84.2 are connected by a slot 84.3 which has a thickness smaller than the diameter of the wires 12.1, 12.2.

The wire guide 82 comprises a passage section 84.1, 84.2 for each of the wires 12.1, 12.2 deposited simultaneously.

Each passage section 84.1, 84.2 has a rectilinear segment which extends from the second end 82.2 by a few millimeters. The segments of the different passage sections are parallel to one another.

The passage sections 84.1, 84.2 are spaced apart slightly so that the wires are close to one another at the moment of contact with the deposition zone 14.

During operation, the wire guide 82 is oriented in such a way that the passage sections 84.1, 84.2 are aligned in a direction parallel to a deposition plane on which the last layer of material is formed.

According to one embodiment, the deposition head 10 comprises a guide sleeve 86 which extends from the drive system 24 (more particularly from the downstream wire guide 76) as far as the guide system 22 (more particularly as far as the guide tube 80).

The deposition head described allows several wires made of the same material or of different materials to be deposited simultaneously. Thus, it makes it possible, with a constant wire section, to increase the rate of material deposited. According to another advantage visible in FIGS. 11A and 11B, the fact that two wires 12.1, 12.2 are provided, as illustrated in FIG. 11A, instead of a single wire F, as illustrated in FIG. 11B, makes it possible to come closer to the section of a deposited layer 88 and to improve the geometry of the deposited layer and, ultimately, the surface condition of the component 90 obtained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A deposition head for a three-dimensional printer, the deposition head comprising:

at least one pay-out device comprising at least two wire spools, each wire spool for a wire, the wires to be deposited simultaneously, a drive system comprising a drive roller configured to pivot about a pivot axis at a rotational speed determined as a function of a desired speed of travel of at least one wire, the drive roller having a cylindrical lateral surface coaxial with the pivot axis, wherein the drive roller has a plurality of grooves positioned on the lateral surface, each groove located in a separate plane perpendicular to the pivot axis, one groove for each wire to be deposited simultaneously, a guide system positioned proximate a deposition zone during operation, the guide system comprising a wire guide which has a first end, a second end close to the deposition zone during operation, compared to the first end, and a passage hole opening out at each of the first and second ends, the passage hole opening comprising a plurality of passage sections at the second end, one second end for each wire to be deposited simultaneously, and wherein each passage section has a section identical to a section of a wire to be guided, and wherein the pay-out device further comprises, for at least one wire spool, a friction braking system for limiting rotation of the wire spool, wherein the pay-out device further comprises at least one cylindrical support on which at least one wire spool is threaded, and wherein the friction braking system comprises a body mounted on the support, a coupling connecting the body and the at least one wire spool, and a friction mechanism limiting, by friction, a pivoting movement of the body with respect to the support.

2. The deposition head as claimed in claim 1, wherein the body comprises first and second tubular parts which are separated by a transverse slot which extends over part of a cross section of the body, the first tubular part mounted on the support with a sliding fit, and the second tubular part comprising a longitudinal slot which extends to the transverse slot in such a way that the second tubular part has a C-shaped cross section with two ends.

3. The deposition head as claimed in claim 2, wherein the friction mechanism comprises a toggle latch connecting the two ends of the C-shaped cross section of the second tubular part.

4. The deposition head as claimed in claim 1, wherein the coupling comprises at least one radial branch which has a first end connected to the body and a second end connected to the wire spool by a removable connecting element.

5. The deposition head as claimed in claim 1, wherein the pay-out device further comprises a bearing face, wherein the support comprises a first end connected to said bearing face, a free end, and an axle perpendicular to the bearing face, wherein the support is dimensioned to support the at least two wire spools such that a first wire spool is closed to the free end compared to the first end of the support and a second wire spool is pressed against the bearing face, and wherein the friction braking system is mounted on the support in such a way that the second wire spool is kept pressed against the bearing face by the first wire spool, which is pressed against the second wire spool by the friction mechanism.

6. The deposition head as claimed in claim 1, wherein the drive system further comprises an upstream or downstream wire guide, positioned upstream or downstream of the drive roller in a direction of travel of the at least one wire, the upstream or downstream wire guide comprising a body which extends between first and second ends and has a passage hole opening out at each of the first and second ends, the second end being positioned as close as possible to the drive roller so a wire therein remains rectilinear between the upstream or downstream wire guide and the drive roller, and, wherein the passage hole opening of the upstream or downstream wire guide comprises a passage section for each wire to be deposited simultaneously, each passage section having a section identical to the section of the wire to be guided.

7. The deposition head as claimed in claim 6, wherein each passage section has a rectilinear segment which extends from the second end by a few millimeters, the segments of each of the passage sections being parallel to one another and being oriented in a direction tangential to the drive roller.

8. The deposition head as claimed in claim 1, wherein the passage sections are separated from one another by a distance substantially equal to that which separates the grooves of the drive roller.

9. The deposition head as claimed in claim 8, wherein each passage section has a rectilinear segment which extends from the second end by a few millimeters, the segments of each of the passage sections being parallel to one another and being oriented in a direction tangential to the drive roller.

10. A three-dimensional printer comprising:

the deposition head as claimed in claim 1.

\* \* \* \* \*